June 16, 1953      E. W. BAGG      2,642,515
REMOTE CONTROL FOR ARC WELDING
Filed Oct. 30, 1950      2 Sheets-Sheet 2
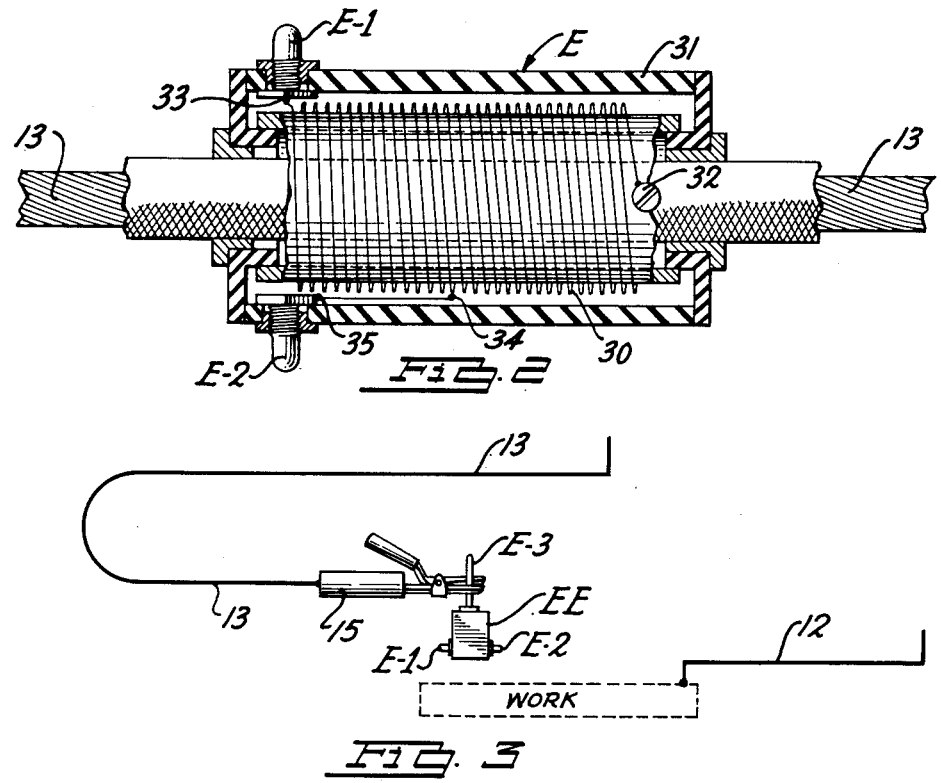
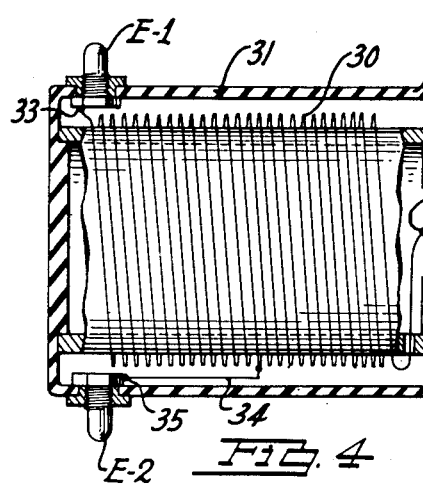
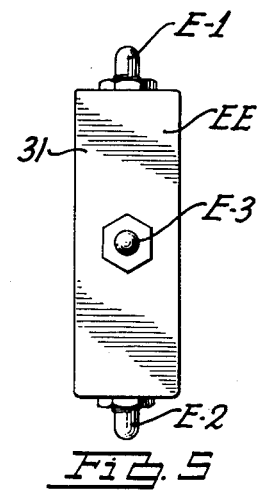
INVENTOR.
EARLE W. BAGG
BY
*Everett F. Wright*
ATTORNEY Patented June 16, 1953

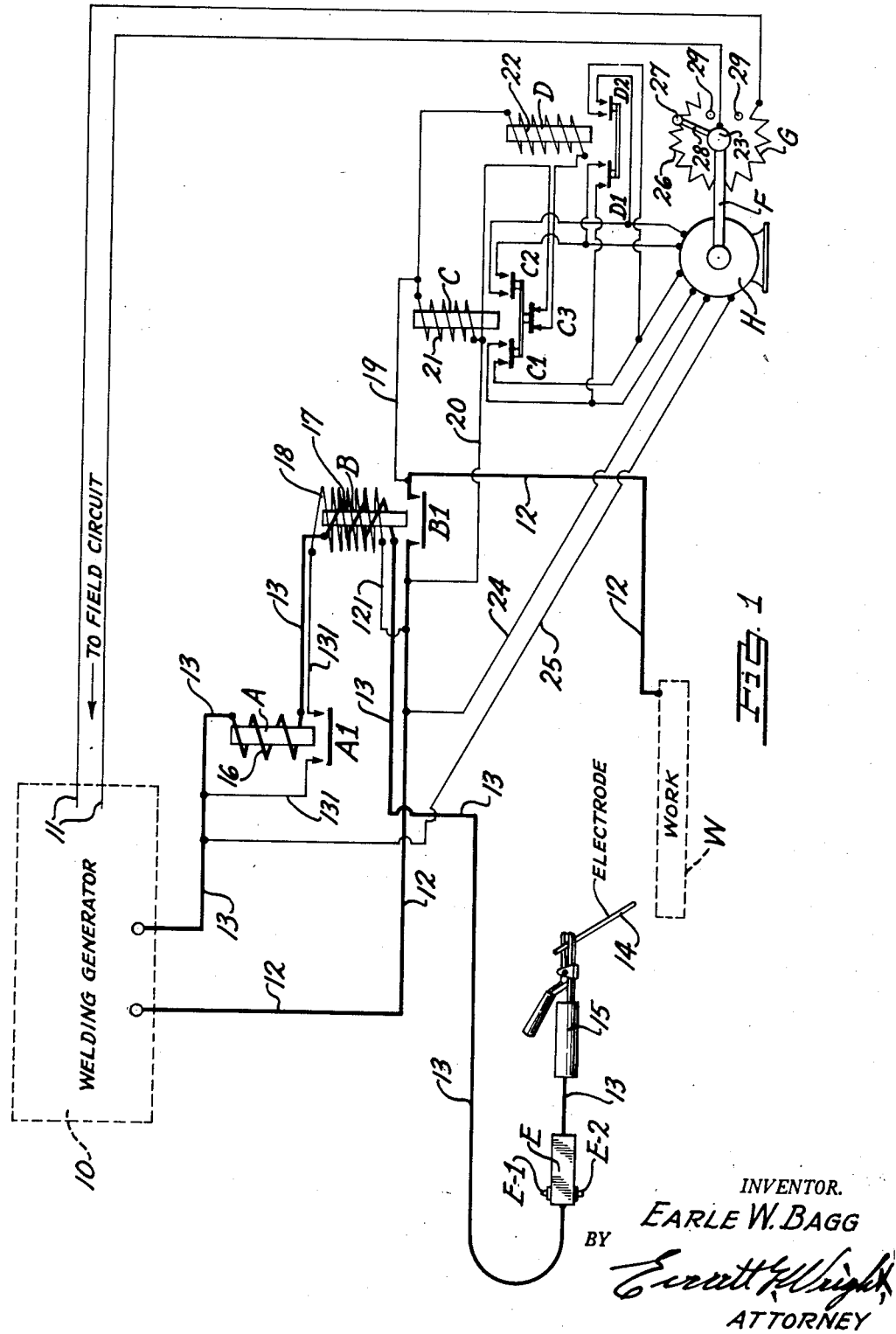

2,642,515

UNITED STATES PATENT OFFICE 2,642,515

REMOTE CONTROL FOR ARC WELDING

Earle W. Bagg, Sans Souci, Mich.

Application October 30, 1950, Serial No. 192,881

3 Claims. (Cl. 219—8)

This invention relates to improved remote control method and means for increasing or decreasing the welding current supplied from an arc welding generator to the work being welded.

In arc welding jobs such as in shipyards, laying pipe lines, in the erection of buildings, and in shops where access to the manual control of the field rheostat of the welding generator is difficult and time consuming. It is costly in time, energy and efficiency for the welder to return to the welding machine and make manual adjustments to increase or decrease the welding current.

In a typical arc welding operation where the instant invention may be employed to advantage, a welding generator furnishes welding current having an open circuit voltage from 90 to 100 volts. The working or welding voltage usually ranges from 20 to 40 volts. One side of the welding circuit is "grounded" to the work. The other side of the welding circuit is run through a suitable insulated single cable to the electrode holder into the jaws of which a welding rod or other suitable electrode is held. The welding generator runs continuously. When the operator touches the electrode to the work he virtually short circuits the generator and the voltage drops to substantially zero while the current or amperage goes up very high. As the operator withdraws the electrode from the work, an arc is made and the voltage goes up to 20 to 40 volts, all according to the specific electrical characteristics of the welding generator. The current or amperage drops and is stabilized at a point previously selected and set by the operator by manually adjusting the field rheostat of the welding generator which is accomplished by turning a control knob on the generator panel which increases or decreases the voltage of the welding current.

If the welding arc is too "hot" or too "cold" to accomplish the particular weld being made, the operator must re-set the welding current rheostat, and this is done by the welder returning from the point of weld to the welding machine. Proper regulation of the welding current may require several trips to obtain the best results. Where various thicknesses of work are welded and where loss of welding current through varying ground resistance occurs, necessity for the adjustment of the welding current may become quite frequent.

The primary object of this invention is to provide an effective, economical and positive method and means for regulating or varying the welding current in an arc welding circuit by the welder from the situs of the welding operation without the necessity of the operator leaving the work and without the employment of extra control cables running from the welding generator to the operator at the work.

Other objects of the invention will become apparent by reference to the following detailed description taken in connection with the accompanying drawings, in which:

Fig. 1 is a diagrammatic view of a method and means embodying the invention for remote control of the welding current in an arc welding operation.

Fig. 2 is a sectional view through a control element preferably fixed around and connected to the welding current cable leading to the electrode holder.

Fig. 3 is a fragmentary diagrammatic view similar to Fig. 1 of a pocket remote control element embodying the invention which is normally carried in the pocket of the operator and is shown positioned in operating relationship in the electrode holder.

Fig. 4 is a sectional view through the pocket type remote control element shown in Fig. 3.

Fig. 5 is an end elevational view of the pocket type remote control element shown in Figs. 3 and 4.

Referring now to the drawings wherein like numerals refer to like and corresponding parts throughout the several views, the embodiment of the invention disclosed in Figs. 1 and 2 comprises, in general, a welding generator 10 having a field circuit 11 controlled by a remote control element E, relays A, B, C and D and a rheostat G operated by a reversible control motor H through a mechanical drive F, all as hereinafter described in detail.

From the said generator 10 a welding current "ground" cable 12 and a "lead" cable 13 provide welding current to the work W and to a welding electrode 14 through an electrode holder 15. A spring loaded normally open series relay A having one set of contacts A-1 and a series winding or coil 16 sufficient to handle the entire welding current is connected in the welding current "lead" 13. A compound wound spring loaded normally open relay B having one set of contacts B-1, a series winding or coil 17 sufficient to handle the entire welding current and a shunt winding or coil 18 has its series coil 17 connected in the welding current "lead" 13 and its shunt winding 18 connected across the "ground" 12 and "lead" 13 by connections 121 and 131 when the welding operator starts welding by touching the electrode 14 to the work W which closes the contacts A-1 of the relay A through the energizing of the series coil 16 of the relay A and the shunt coil 18 of the relay B. As soon as the shunt coil 18 of the relay B closes the contacts B-1 of relay B, the series coil 17 of relay B becomes energized, and, because the series coil 17 of the relay B is more powerful than the shunt coil 18 of relay B, the contacts B-1 of relay B are held very tightly closed whereby to prevent arcing at the contacts B-1. This is extremely important since the contacts B-1 carry the entire welding current which often is as high as several hundred amperes.

When the operator or welder touches the electrode 14 to the work W, current flows from the generator 10 through the coil 16 of relay A and the shunt coil 18 of relay B whereupon the contacts B-1 of relay B are closed and welding current flows from the generator 10 through the series coil 16 of relay A and the series coil 18 of relay B during the normal arc welding operation.

Connected in series with the contacts B-1 of relay B are control current leads 19 and 20 through which current is supplied to the series winding or coil 21 of control relay C and the series winding or coil 22 of control relay D. Current for the reversible control motor H which operates the rheostat G by means of a mechanical drive F to either increase or decrease the welding current from the generator 10 is supplied through control motor current leads 24 and 25 from the "ground" 12 and "lead" 13 of the generator 10 and through control motor current circuits completed by relays C and D as hereinafter described.

Inasmuch as the contacts B-1 of the relay B close immediately upon touching of the electrode 14 to the work W and remain closed during the welding operation, the control current leads 19 and 20 are short circuited, no current passes through the control relays C and D, and the welding current supplied to the electrode 14 and the work W remains as set by the rheostat G.

When the welder or operator is not performing an arc welding operation, no current passes through the series coil 16 of relay A and its contacts A-1 are open thereby breaking the circuit through the shunt coil 18 of relay B which has its contacts B-1 open, therefore, no current is passing from the generator 10 through the welding circuit to the electrode 14 and the work W and no current is passing from the generator 10 through the control current leads 19 and 20 or the control motor current leads 24 and 25.

The rheostat G consists of a resistance 26 varied by a movable contact 27 which, in the rheostat G indicated in the drawing, is mounted on a circumferentially swingable arm 28 driven by a reversible control motor H through a mechanical drive preferably including a friction clutch element which permits manual setting of the rheostat G by a knob 23 if desired. Stops 29 limit the movement of the swingable arm 28 and the movable contact 27 carried thereby.

In the embodiment of the invention shown in Figs. 1 and 2, a remote control element E is provided in a convenient location on and connected to the "lead" cable 13 to the electrode holder 15 into which a suitable welding electrode is positioned. The remote control element E comprises a resistance coil 30 mounted in a suitable insulated housing 31 from which a welding current "decrease" contact point E-1 and a welding current "increase" contact point E-2 extend. One end of the winding of the resistance coil 30 is connected to the "lead" cable 13 at 32. The other end of the winding of the resistance coil 30 is connected to the "decrease" contact E-1 at 33. A tap 34 taken from approximately the center of the winding of the resistance coil 30 is connected to the "increase" contacts E-2 at 35. The resistance of the full resistance coil 30 and the resistance of one-half the resistance coil 30 obtained by touching either the "decrease" contact E-1 or the "increase" contact E-2 respectively of the remote control element E to the work W is such that the series coil 16 of relay A and the series coil 17 of relay B will not function but the shunt coil 18 of relay B will function and close the contacts B-1 thereof. Thus, when it is desired to decrease or increase the welding current supplied by the welding generator to the work W, the use of the remote control element E by placing either the "decrease" contact E-1 or the "increase" contact E-2 thereof against the work W supplies current to the control circuit through the control current leads 19 and 20.

The relative characteristics of relays C and D are such that it requires more current in the coil 21 of relay C to cause it to function than the current required in the coil 22 of relay D to cause relay D to function. Relay C has three sets of contacts C-1, C-2 and C-3. Contacts C-1 and C-2 are spring loaded open while contacts C-3 are spring loaded closed. When relay C functions by the proper current being supplied to the coil 21 thereof, contacts C-1 and C-2 are closed and contacts C-3 are opened. Relay D has two sets of contacts D-1 and D-2 which are spring loaded open. When relay D functions by the proper amount of current being supplied thereto, which is less by approximately half of that supplied to relay C, contacts D-1 and D-2 are closed.

Obviously, the greater resistance in the control current, the less current is available to operate the control circuit relays C and D. The resistance of the full resistance coil 30 is such that current passing through the control circuit is less than sufficient to operate relay C and consequently only relay D will operate when the "decrease" contact E-1 of the remote control element E is contacted against the work W. The current passing through the control circuit when the "increase" contact E-2 of the remote control element E is contacted against the work W is sufficient to operate relay C.

To increase the welding current supplied to the electrode 14 and the work W from the welding generator 10, the welder or operator touches contact E-2 of the remote control element E to the work W. This operates relay B and closes contacts B-1 thereof energizing the coils of relays C and D and operating relay C which opens contacts C-3 thereof which cuts relay D out of the control circuit. Contacts C-1 and C-2 of relay C are then closed and motor current is applied to the motor windings of the control motor H from motor current leads 24 and 25 to run it counter-clockwise as viewed in Fig. 1 which turns the swingable arm 28 of the rheostat G moving its movable contact 27 counter-clockwise as viewed in Fig. 1 to lessen its resistance thus strengthening the field of the generator 10 and thereby increasing its output.

To decrease the welding current supplied to the electrode 14 and the work W from the generator 10, the welder or operator touches contact E-1 of the remote control element E to the work W. This operates relay B and closes contacts B-1 thereof energizing the coils of relays C and D and operates relay D only. Contacts D-1 and D-2 of relay D are then closed and motor current is applied to the windings of the control motor H from the motor current leads 24 and 25 to run it clockwise which turns the swingable arm 28 of the rheostat G moving its movable contact 27 clockwise to increase its resistance thus weakening the field of the generator 10 and thereby decreasing its output.

The invention provides effective means by which a welder may increase or decrease minutely the welding current supplied from a welding generator to the work and welding electrode from the location or situs of the work without the necessity for repeated trips from the work to the welding generator. This not only saves time in welding operations where access to the welding generator controls is difficult but enables the welder to adjust the arc to either "hotter" or "colder" as required to cope with varying welding conditions encountered in most arc welding operations. The length of time the welder holds "increase" contact E-2 or "decrease" contact E-1 to the work W determines the extent to which the welding current output from the generator 10 is increased or decreased, therefore, any degree of variation of welding current from the generator 10 may be accompilshed within the range of the rheostat G.

Referring now to Figs. 3, 4 and 5, an alternate or "pocket" type remote control element EE is shown replacing the remote control element E shown in Figs. 1 and 2, the difference being that the remote control element EE is not connected permanently in the "lead" cable 13.

The remote control element EE comprises a resistance coil 30 mounted in a suitable insulated housing 31 from which a welding current "decrease" contact point E-1, a welding current "increase" contact point E-2 and a "lead" contact E-3 extend. One end of the winding of the resistance coil 30 is connected to the "lead" contact E-3 at 32. The other end of the winding of the resistance coil is connected to the "decrease" contact E-1 at 33. A tap 34 taken from approximately the center of the winding of the resistance coil 30 is connected to the "increase" contact E-2 at 35. The use of the "pocket" type remote control element EE is like and similar in every respect to the use of the fixed type remote control element E except that it must be held by its "lead" contact E-3 in the electrode holder 15 as illustrated in Fig. 3 prior to the time either of the contact points E-1 or E-2 are touched to the work W to accomplish a "decrease" or "increase" of the welding current supplied by the welding generator 10.

It will be observed that the invention has been described in connection with the remote control of the field rheostat on a D. C. arc welding generator; however, it is obvious that the invention may be applied with equal advantage and efficacy in the remote control of the primary switch on the transformer of A. C. type arc welding equipment, all without running extra cables from the generator or transformer to the situs of the weld.

Although but a single embodiment of the invention and but one alternate construction has been disclosed and described in detail, it is obvious that many changes may be made in the size, shape, arrangement and detail of the various elements of the invention without departing from the spirit and scope thereof as defined by the appended claims.

I claim:

1. Means for controlling the welding current from an arc welding generator remote therefrom comprising a reversible electric motor driven rheostat regulating the field current therefrom and a welding and a control relay system located at the generator, a welding current lead from the generator to the welding electrode and a welding current ground lead the generator to the work, the welding relay system being normally open and closeable responsive to striking the arc, the said control relay system including two relays each closeable responsive to the application thereto of a different definite current value lower than the welding current value closing a circuit from the generator to the motor driven rheostat, one relay and circuit driving the motor in one direction turning the rheostat to increase the welding current and the other relay and circuit driving the motor in the other direction turning the rheostat to decrease the welding current, and two resistances each of a different capacity connected to the welding current lead at the situs of the welding operation each having a free contact applicable to the work whereby to selectively introduce either different definite resistance into the control relay system and actuate one or the other of the said relays thereof.

2. In a remote control of welding current from an arc welding generator whereat a reversible electric motor driven rheostat regulates the field output thereof, a welding current lead from the generator to the welding electrode and a welding current ground lead from the generator to the work, a relatively high resistance and a relatively low resistance connected to the welding current lead near the welding electrode arranged to permit the free terminals thereof to be contacted selectively to the work, a welding current circuit including two relays closeable responsive to the touching of the electrode to the work when welding, and a welding current regulating circuit deriving current from the welding current leads comprising two relays one operable responsive to a relatively low definite current value through the said relatively high resistance driving the field regulating rheostat in one direction and the other operable responsive to a relatively high definite current value through the said relatively low resistance driving the field regulating rheostat in the other direction whereby to increase or decrease the output of the welding generator.

3. A remote control of welding current from an arc welding generator as claimed in claim 2 wherein the welding current regulating circuit is connected to be short-circuited out of functioning responsive to the closing of the welding current circuit during welding.

EARLE W. BAGG.

References Cited in the file of this patent

UNITED STATES PATENTS

| Number | Name | Date |
|---|---|---|
| 1,253,198 | Montgomery et al. | Jan. 8, 1918 |
| 1,428,529 | Caldwell et al. | Sept. 12, 1922 |
| 2,487,375 | Rimmington | Nov. 8, 1949 |